United States Patent [19]

Percel et al.

[11] Patent Number: 4,511,592
[45] Date of Patent: Apr. 16, 1985

[54] PREPARATION OF ACIDULATED MEAT EMULSIONS

[75] Inventors: Phillip J. Percel, Parma; Douglas W. Perkins, Medina; Anthony V. Petricca, Rocky River, all of Ohio

[73] Assignee: SCM Corporation, New York, N.Y.

[21] Appl. No.: 622,506

[22] Filed: Jun. 20, 1984

Related U.S. Application Data

[62] Division of Ser. No. 356,940, Mar. 11, 1982.

[51] Int. Cl.³ .............................................. A23L 1/31
[52] U.S. Cl. .................................. 426/646; 426/650; 426/652
[58] Field of Search ................. 426/96, 289, 294, 302, 426/646, 650, 652

[56] References Cited

U.S. PATENT DOCUMENTS

| | | | |
|---|---|---|---|
| 2,170,954 | 12/1939 | Stange | 99/140 |
| 2,876,160 | 3/1959 | Schoch et al. | 167/82 |
| 2,992,116 | 7/1961 | Sair | 99/159 |
| 3,016,299 | 1/1962 | Raffensperger et al. | 426/289 X |
| 3,016,300 | 1/1962 | Raffensperger et al. | 426/289 X |
| 3,091,567 | 5/1963 | Wurzburg et al. | 167/42 |
| 3,131,068 | 4/1964 | Grelf et al. | 99/139 |
| 3,159,585 | 12/1964 | Evans et al. | 252/316 |
| 3,359,119 | 12/1967 | Milton | 426/96 X |
| 3,359,120 | 12/1967 | Meusel et al. | 99/109 |
| 3,499,962 | 3/1970 | Wurzburg et al. | 424/35 |
| 3,560,222 | 2/1971 | Delaney | 99/108 |
| 3,681,086 | 8/1972 | Cox et al. | 426/96 X |
| 3,819,838 | 5/1974 | Smith et al. | 426/89 |
| 3,821,436 | 6/1974 | Fry | 426/213 |
| 3,949,096 | 4/1976 | Johnson et al. | 426/294 X |
| 3,985,913 | 10/1976 | Johnson et al. | 426/650 |
| 4,022,924 | 5/1977 | Mitchell et al. | 426/650 |
| 4,059,706 | 11/1977 | Pischke et al. | 426/96 X |
| 4,068,006 | 1/1978 | Moritz | 426/650 X |
| 4,262,027 | 4/1981 | Tonner et al. | 426/325 |
| 4,276,312 | 6/1981 | Merritt | 426/650 X |

FOREIGN PATENT DOCUMENTS

| | | | |
|---|---|---|---|
| 1184 | 1/1973 | Japan | 426/96 |
| 1185 | 1/1973 | Japan | 426/96 |
| 1138765 | 1/1969 | United Kingdom . | |

*Primary Examiner*—Arthur L. Corbin
*Attorney, Agent, or Firm*—Richard H. Thomas

[57] ABSTRACT

The present invention resides broadly in a method for applying water soluble coatings to highly water soluble core particles selected from the group consisting of sugar, salt, yeast, and solid acidulants, comprising the steps of selecting core particles of fine particle size such that a preponderance of the particles pass through a 16 mesh screen, U.S. Standard Sieve; forming a fluid bed of said core particles; spraying into said bed in the form of a fine mist a water soluble coating composition comprising water and a water soluble coating material selected from the group consisting of a film-forming, edible, bland, hydrolyzed starch and a protein, said coating material having a water solubility sufficient to produce a pumpable solution at about 20–40% solids concentration, based on solution weight; continuing said spraying for a time sufficient to obtain a coating build-up on said core particles of at least about 10–50% based on coated particle weight; said coated particles having substantially the same particle size as the core particles. The coated acid particles are added to a meat emulsion in preparation of acidulated meat emulsions.

5 Claims, No Drawings

PREPARATION OF ACIDULATED MEAT EMULSIONS

This is a division of application Ser. No. 356,940, filed Mar. 11, 1982.

The present invention relates to the acidulation of meat and other food products, and particularly to a coated acidulant useful for such acidulation, and method for making the same. The present invention will be described with respect to the acidulation of meat products such as winter sausage, which are not subjected to heating during preparation, and to the manufacture of coated acidulants, particularly suitable for such meat products, although it will be apparent to those skilled in the art that the present invention has other applications.

BACKGROUND OF THE PRESENT INVENTION

The acidulation of meat products, particularly meat emulsions, is well known. Meat emulsions, for instance sausage emulsions, are mixtures of lean meat or meat protein and water forming a matrix in which fat particles, salt, sugar and curing agents are dispersed. It is well known that the emulsifying action generally decreases with increasing acidity of the emulsion. Specifically, the water-binding capacity and the emulsifying qualities of the meat protein are affected by the emulsion pH. To obtain a stable emulsion, it is necessary to avoid the presence of too much acid during the preparation and processing of the emulsion. Generally the emulsions are stable when the critical pH is about 6 or higher.

However, it is desirable to achieve a pH lower than about 6 in the final product to enhance flavor, texture and keepability. It has been observed that a pH decrease after the emulsion is formed does not generally alter the initial quality of the emulsion, which by that time is comparatively stable. Reference can be had in this regard to U.S. Pat. No. 2,992,116, obtained by Louis Sair; and British Pat. No. 1,138,765 (Unilever Ltd.).

Both of these patents propose the use of an acidulant which can be incorporated into the meat emulsion prior to processing the emulsion, but which has a delayed reaction, so that acidulation takes place subsequent to emulsification. In the U.S. Pat. No. 2,992,116 patent, the agent is glucono delta lactone, which slowly hydrolizes to form gluconic acid. In the British Pat. No. 1,138,765, the agent is a lactide such as DL-lactide (meso-form).

Neither acidulant has met with substantial commercial success. For instance, because of premature hydrolysis and unreliability regarding the rate of reaction and flavor, glucono delta lactone (GDL) has been used only very cautiously in the sausage industry, and some companies have discontinued use of the same altogether. DL-Lactide is not permitted by law as an ingredient in the United States, and its commercial availability is limited.

In prior U.S. Pat. No. 3,359,120, coated fumaric acid is proposed as an acidulant for meat emulsions to enhance color and color stability. The coating, in this patent, can be either a wax, monoglyceride, or vegetable oil. Processing temperatures in the processing of the meat product, for instance smoke house temperatures, cause the coatings to melt, releasing the fumaric acid and resulting in color development. One problem with this procedure is that not all meats are processed using high temperatures, for instance summer sausages. Also, as suggested in the Delaney U.S. Pat. No. 3,560,222, some difficulty may be experienced in obtaining a uniform thin coating completely or substantially completely covering the acid crystals. In the Delaney patent, this problem is said to be overcome by providing an inner water soluble coat, partly enveloping and encasing the acid crystals, followed by an outer, inert, water insoluble, heat-rupturable coating completely enveloping the particulate acidulant. The problem with the procedure of this patent is that one still needs heat to rupture the outer coating, and again, not all meats are processed using heat. The inner water-soluble coat, referred to as a vehicle, in the patent, may be a gum such as gum arabic and cebil gum, an inert salt exemplified by sodium caseinate, gelatin, sugar, confectioner's glaze, and the like. Another problem with fumaric acid is its undesirable characteristic flavor.

Concerning the above patents, a distinction has to be made between acidification for fixing color and acidification for texture and meat preservation. Normally, the former requires less than about 0.1% free acid, and the latter about 0.5-2% free acid.

Related to the above two patents is recently issued U.S. Pat. No. 4,262,027 (Tonner et al.) on the use of a water soluble hydrocolloid (e.g. gum) along with a fat encapsulated acidogen during the acidification process. The product also would not be useful in an acidulation process where heat is not used.

Prior U.S. Pat. No. 3,131,068 (Grelf et al.) describes coating a solid acidulant with water soluble hydroxypropyl methylcellulose. This material, which is not highly water soluble, requires the use of a solvent, such as chloroform or ethylene dichloride, during application of the coating. Disadvantages are the cost of use of a solvent and its possible toxicity as well as its insolubility.

It is known to use starch as a matrix or carrier for food additives. Generally, such food additives are liquid materials such as oleo resins, essential oils, and flavorants. Examples are given in U.S. Pat. No. 2,170,954 (to Stange), disclosing the use of a gelatinized starch; in U.S. Pat. No. 2,876,160 (to Schoch et al.), which discloses the use of dextrins having high solubility in cold water (e.g. 80% solubility or above), the dextrin forming a matrix for such materials as vitamin A; U.S. Pat. No. 3,091,567 (to Wurzburg et al.), disclosing the use of an ungelatinized starch acid ester for encapsulating water-insoluble flavors, perfumes, and other substances; U.S. Pat. No. 3,159,585 (to Evans et al.), on the use of the dextrins derived from oxidized starches (containing a controlled amount of carboxyl groups) for encapsulation of volatile materials such as flavoring oils and perfumes; U.S. Pat. No. 3,499,962 (to Wurzburg et al.), on the use of an amylose product for encapsulating water insoluble materials; U.S. Pat. No. 3,819,838 (to Smith et al.), on the use of "modified starch" for encapsulating essential oils, oleo resins and other flavoring essences, and U.S. Pat. No. 3,821,436 (to Fry), on the use of a starch hydrolysate having a D.E. less than about 40, as a carrier "for flavoring agent". In all of the above cases, the products are generally made by forming a mixture of the carrier and active ingredients and subjecting the same to spray drying or other similar procedure, followed by some form of maceration to obtain fine particles. In none of the procedures is it clear that a product is obtained of uniformly small particle size in which a core particle is enveloped by a thin, protective layer.

BRIEF DESCRIPTION OF THE PRESENT INVENTION

The present invention resides in a method for the preparation of acidulated meat emulsions, particularly meat emulsions which are cured without heating, for preservation and improving texture, comprising the steps of (a) emulsifying a source meat; and (b) mixing with said source meat during emulsification a preserving and/or texturizing amount of a particulate acidulant comprising a solid acid core particle and a coating of a water soluble, film-forming, edible, bland starch hydrolysate or protein, said starch hydrolysate or protein having a water solubility sufficient to produce a pumpable solution at about 20–40% solids concentration, based on solution weight; the particle size of the particulate acidulant being not substantially in excess of about 20 mesh, U.S. Standard Sieve, the weight ratio of solid acid core particle to starch or protein coating being in the range of about 90–50:10–50.

For purposes of the present application, the term "solid acid core particle" shall mean particulate solid acid, and also liquid acid on a carrier, for instance liquid lactic acid on a carrier such as calcium lactate.

Also, for purposes of the present application, it is understood that the term "acid" shall mean food grade acids or acidifying agents suitable for human consumption. Examples of such acids, in addition to lactic acid, (on a carrier), are fumaric acid, malic acid, citric acid, GDL (glucono delta lactone), ascorbic acid, tartaric acid, adipic acid and isoascorbic acid and compatible mixtures thereof. A preferred acid for its flavor is lactic acid. A preferred coating material is malto-dextrin.

Other terms in the above statement of invention shall have the following meanings:

| | |
|---|---|
| edible | suitable for human consumption; |
| bland | free of clearly discernible or objectionable flavor or odor in the claimed composition; |
| water soluble | means water dispersible as well. |
| pumpable | sprayable through a spray nozzle, under pressure, at useful solution temperatures; |
| acidulant | the acid core particle plus coating. |

A preserving and/or texturizing amount of acid normally is about 0.5–2% free acid, based on the weight of the meat emulsion, although this can vary depending on the emulsion composition. The exact amount required will be known to those skilled in the art.

The present invention also resides broadly in a particulate acidulant useful for dispersion in meat emulsions, especially meat emulsions which are cured without heating, for acidulating the same, comprising (a) a solid acid core particle (b) a coating on said acid core particle, said coating being a water soluble, film-forming, edible, bland, starch hydrolysate or protein which has a water solubility sufficient to produce a pumpable solution at about 20–40% solids concentration, based on solution weight; said acidulant having a particle size not substantially in excess of about 20 mesh, U.S. Standard Sieve; the weight ratio of solid acid core particles to starch or protein being in the range of about 90–50:-10–50.

The present invention also resides broadly in a method for applying water soluble coatings to highly water soluble core particles selected from the group consisting of sugar, salt, yeast, and solid acidulants, comprising the steps of selecting core particles of fine particle size such that a preponderance of the particles pass through a 16 mesh screen, U.S. Standard Sieve; forming a fluid bed of said core particles; spraying into said bed in the form of a fine mist a water soluble coating composition comprising water and a water soluble coating material selected from the group consisting of a film-forming, edible, bland, hydrolized starch and a protein, said coating material having a water solubility sufficient to produce a pumpable solution at about 20–40% solids concentration, based on solution weight; continuing said spraying for a time sufficient to obtain a coating build-up on said core particles of at least about 10–50% based on coated particle weight; said coated particle having substantially the same particle size as the core particles.

DETAILED DESCRIPTION OF THE PRESENT INVENTION

Although the present invention is not limited to specific methods for preparing the particulate acidulants, nor to specific apparatus in which said methods are carried out, a preferred method and apparatus for the practice of the present invention are disclosed in copending application Ser. No. 337,722, filed Jan. 7, 1982, now abandoned. As disclosed in such application, the apparatus comprises a fluidized bed chamber which is generally cylindrical in shape but which is provided with an expansion zone at the top to limit elevation of the bed in the fluidizing chamber. An air distribution plate across the bottom of the chamber maintains the bottom of the bed.

An inlet is provided at the bottom of the chamber, beneath the air distribution plate, for introducing a fluidizing medium into the chamber. A second inlet is provided at the side of the chamber, above the air distribution plate, for introducing particulate core acid particles into the chamber. Above the normal level of the bed, there is provided a spray nozzle for spraying the starch or protein coating material onto the acid particles, the latter being maintained in a fluidized condition in the bed by the fluidizing medium.

Preferably, the fluidizing medium, for instance air, is at an elevated temperature to evaporate moisture from the starch coating material after the latter is applied to the surface of the core acid particles. To be effective, the temperature of the heating medium is above ambient, for instance about 175° F.

In operation, the core acid particulate is first introduced into the fluidized bed chamber, after which the bed is established, followed by application of the starch or protein coating material to the surface of the core acid particulate, followed on a batch-cycle basis by withdrawal of the finished product from the fluidized bed chamber.

The velocity of the fluidizing medium in the chamber is that necessary to establish the fluid bed and will be known to those skilled in the art.

The temperature of the starch or protein coating material also is preferably ambient temperature, about 100°–120° F. By way of example, it is pumped into the agglomerating chamber through a binary nozzle (e.g. manufactured by Schlick Co., having a port size of 1.2–2.5 mm) at a flow rate of about 120–150 pounds of solution per hour, and an atomization pressure sufficient to obtain a fine mist spray.

One such spray agglomerator that can be employed is marketed by Glatt Air Techniques, Inc., Model "GPCG 500". A similar apparatus is marketed by Aeromatic, Inc. of Bernardsville, N.J.

Broadly, the present invention is directed to the application of water soluble coatings to core particles which themselves are highly water soluble, such as salt, sugar and solid or crystalline acids (generically referred to as solid acids). For the acidulation of meats, the present invention is specific to coated acidulants (acid core particle plus coating) having a particle size not substantially in excess of about 20 mesh.

The limit on fineness of particle size is dictated by ability to form a fluid bed of the particles and to coat the particles with a reasonable amount of coating. As indicated in the following Table 1, the limit can be as fine as "40% max. thru a U.S. 200 mesh screen".

Food grade acids useful in the present invention are those which are normally in solid or crystalline form, are water soluble, and are selected from the group consisting of citric acid, tartaric acid, ascorbic acid, isoascorbic acid, adipic acid, glucono delta lactone (GDL), fumaric acid, and malic acid. Also within the scope of the present invention is the use of typical food grade liquid acids such as lactic acid, applied to a suitable carrier such as calcium lactate, in accordance with known technology, so as to be in particulate form.

The following Table 1 gives particulars with regard to core particles successfully coated, or coatable, and useful in the practice of the present invention: (See Table 1)

TABLE 1

| Core Particle | Particle Size | Solubility |
|---|---|---|
| For General Application | Granular | |
| Citric Acid | 2% max. on U.S. 16<br>10% max. thru U.S. 50 | 71 grams per<br>100 mls. at 50° C. |
| Ascorbic Acid | 10% max. thru U.S. 50 | 40 grams per<br>100 mls. at 45° C. |
| Sugar | Trace max. on U.S. 20 | 200 grams per<br>100 mls. at 25° C. |
| Salt | 2% max. on U.S. 30<br>1.5% max. thru U.S. 100 | 36 grams per<br>100 mls. at 25° C. |
| For Meat Applications | Fine Granular | |
| Citric Acid | 3% max. on U.S. 30<br>5% max. thru U.S. 100 | 71 grams per<br>100 mls. at 50° C. |
| Glucono Delta Lactone | 5% max. on U.S. 16<br>40% max. thru U.S. 200 | 59 grams per<br>100 mls. |
| Tartaric Acid | 5% max. on U.S. 30<br>10% max. thru U.S. 100 | 195 grams per<br>100 mls. at 50° C. |
| Fumaric Acid | 0% on U.S. 30<br>10% max. thru U.S. 100 | 2.4 grams per<br>100 mls. at 60° C. |

TABLE 1-continued

| Core Particle | Particle Size | Solubility |
|---|---|---|
| Ascorbic Acid | 5% max. on U.S. 30<br>10% max. thru U.S. 80 | 40 grams per<br>100 ml at 45° C. |
| Lactic Acid on Calcium Lactate | | 50 grams per<br>100 mls. at 50° C. |

Table 1 demonstrates that the present invention is useful broadly with water soluble particulate, and especially with highly water soluble solid particulate having a water solubility about the same or greater than that of common table salt, including even more soluble substances, up to a solubility as high as 200 grams per 100 mls. at 25° C. (sugar), and that such particulate can be in the category of granular (size-wise) or fine-granular. For meat acidulation, where uniform acidulation of the meat is a criteria, the core particulate preferably is fine granular, defined as having a particle size such that a preponderance passes through a 20 U.S. Standard Sieve.*

* In Table 1, the language "3% max. on U.S. 30" means only 3% maximum remains on a U.S. 30 sieve. The language "5% max. thru U.S. 100" means only 5% maximum passes through a U.S. 100 sieve.

In Table 1, particle sizes are given for the core particles. An important aspect of the present invention is that the coating of the core particles takes place without significant agglomeration or particle size increase. In other words, citric acid of particle size such that 3% maximum remains on a 30 mesh U.S. sieve, coated by the practice of the present invention, will have a particle size not substantially increased. For meat acidification, the coated particulate will have a particle size preferably not substantially in excess of 20 mesh, U.S. Standard Sieve.

This is illustrated in the following Table 2, which gives particle size distributions for various acidulants of Table 1 and comparative data for raw acid core particles. (See Table 2)

TABLE 2

PARTICLE SIZE DISTRIBUTION

| | Citric Acid | | | Citric Acid ML-70 | | Tartaric Acid | | | GDL | | | GDL | | Ascorbic Acid | | |
|---|---|---|---|---|---|---|---|---|---|---|---|---|---|---|---|---|
| ON | Raw | ML-70 | Raw | (L) | ON | Raw | ML-85 | ON | Raw | ML-70 | Raw | ML-70 | ON | Raw | ML-70 |
| 10 | 0% | .12% | | 0.08% | | | | | | | | | 10 | | 0.06 |
| 20 | | .63 | 6.2 | 31.33 | 20 | 0.0 | 1.42 | 20 | | 0.2 | | 0.22 | 20 | 0.3 | 0.78 |
| 30 | | | 62.4 | 39.91 | 30 | 0.0 | | | | | | | | | |
| 40 | 42.7 | 44.52 | 30.6 | 18.61 | 40 | 25.4 | 50.25 | 40 | | 19.57 | | 18.38 | 40 | 21.2 | 19.44 |
| 50 | 41.1 | | 0.8 | | | | | 50 | 26.9 | | 26.9 | | | | |
| 60 | 7.7 | 36.50 | | 5.6 | 60 | | 46.74 | 60 | 8.9 | 29.59 | 8.9 | 34.14 | 60 | 52.2 | 48.87 |
| | | | | | 70 | 70.4 | | 70 | 3.0 | | 3.0 | | | | |
| 80 | 6.3 | 7.46 | | | 80 | | 1.01 | 80 | | 13.76 | | 18.83 | 80 | 18.9 | 14.85 |
| pan | 2.2 | 10.77 | 0.0 | 4.47 | pan | 4.2 | 0.58 | | | | | | | | |
| | | | | | | | | 100 | 19.0 | | 19.0 | | 100 | 4.0 | |
| | | | | | | | | 120 | 11.7 | | 11.7 | | | | |
| | | | | | | | | 140 | 8.7 | | 8.7 | | 140 | 2.3 | |
| | | | | | | | | | | | | | pan | 1.1 | 16.0 |
| | | | | | | | | 400 | 20.8 | | 20.8 | | | | |
| | | | | | | | | pan | 1.0 | 36.88 | 1.0 | 28.43 | | | |

In Table 2, the heading "ON" means retained over or on a mesh size, U.S. Standard Sieve. The designation "ML-70" means malto-dextrin, applied in an amount of 30% dry weight percentage to give a product containing 70% acid. Similarly, "ML-85" means 85% acid. "Raw" means bare acid without coating. The letter (L) in parentheses means that the acid coated was granular rather than fine granular.

The data of Table 2 shows that there was little particle size increase from coating. For instance, with fine granular size citric acid (the first item), a 40 mesh screen retained 42.7% of the raw acid and only 44.52% of the coated acid. With granular citric acid, 64.4% of the raw acid was retained on a 30 mesh screen, and 6.2% on a 20 mesh screen. There was an increase in retention of the coated product on a 20 mesh screen (to 31.33%), but the retention of 30 mesh or coarser particles remained about the same (68.6 v 71.32). This was deemed to be indicative of no significant agglomeration, and little particle size increase from a functional point of view. In other words, the amount of particles finer than 40 mesh and coarser than 10 mesh remained about the same.

Critical features of the present invention towards achieving the above results are the choice of coating material and application conditions. Preferably, the same are selected to obtain complete or substantially complete coverage at coating weights of about 10–50% (based on product weight), and as long as the coating weight range is not exceeded, little increase in particle size is obtained. Below about 10% coating weight, less than complete coverage is obtained. Above about 50% by weight an inordinate amount of time is required for the coating application. Optimum results are obtained with coating weights in the preferred range of about 20–30%.

A preferred coating material of the present invention is a water soluble starch hydrolysate, specifically one that is capable of forming a high solids solution or dispersion at application temperature. A low solids dispersion requires the removal of too much water during drying and film formation, unduly prolonging processing time and resulting in possible agglomeration. A water solubility sufficient to produce a pumpable solution at about 20–40% solids concentration, preferably 30–40% solids concentration, thus, is critical. Above about 40% solids concentration, the dispersion becomes too viscous for spray atomization. Starch hydrolysates in this category generally have a dextrose equivalent (D.E.) below about 20.

It is also critical that the starch hydrolysate be film-forming on drying. Starches which are substantially degraded during hydrolysis are very water soluble but poor film-formers. By film-forming, it is meant that in addition to forming a substantially impervious coat, the coat is also non-tacky, non-agglomerating, and generally non-hygroscopic when dried.

Specific starches which meet these criteria will be known to those skilled in the art.

One particularly preferred starch hydrolysate useful in the practice of the present invention is a highly water soluble malto-dextrin marketed by Grain Processing Corporation under the trademark Maltrin M-100. This product is sold as a bulking and bodying carbohydrate. It has a dextrose equivalent of 9–12 and disperses in water to produce clear solutions at 35–40% concentrations. At 40% concentration, the product is pumpable and capable of spray atomization and has good film-forming characteristics following drying when applied at a coating of about 20–30% based on product weight.

Another useful hydrolyzed starch is a malto-dextrin marketed by American Maize Products Company under the trademark Fro-Dex 10. This product has a dextrose equivalent of about 12, is soluble up to about 40% solids, without substantial viscosity increase, and has good film-forming properties when applied at a coating of about 20–30% and dried.

A third useful starch is a low viscosity, modified starch marketed by National Starch under the trademark Film-Set. Its conventional use is in confectionery coatings. At 30% solids concentration, it forms a low viscosity, pumpable solution capable of spray atomization. Coatings at 20–30% are substantially impermeable, and are non-tacky and non-agglomerating.

In the practice of the present invention, for meat acidulation, it is preferred to add the encapsulated acid, in a preservation or texturizing amount, at a point near the end of the emulsification period. Specifically, meat emulsification is usually carried out by grinding the meats to desired particle size, mixing them together until a homogeneous mixture is obtained, and then adding the spices used and other ingredients while continuing the mixing. Preferably, the encapsulated acid of the present invention is added with the spices, or after spice addition. After thorough mixing, the mixture is then stuffed into a casing and hung up for curing, or otherwise cured. One type of meat with which this procedure is carried out is referred to as winter sausage. The procedure can be characterized as one in which no heat is employed in the processing. Because of the absence of heat, the conventional fat encapsulated acid cannot be employed since the integrity of the fat coating would not be lost during processing and lowering of the meat pH would not occur.

In the present invention, since the coatings are water soluble, the moisture present in the meat destroys the coating integrity, causing acid release. However, despite the high solubility of the coatings of the present invention, the release is not instantaneous, and full acidulation normally will not take place until after the sausage is stuffed into a casing. Although not bound by any theory, it is believed, in this regard, that the water in the meat emulsions is bound water and only small and measured amounts become successively available and migrate to dissolve the coating.

A principal advantage of the present invention, in addition to delay in acid release, should now be apparent. By maintaining a fine particle size of the coated acid, with minimum agglomeration, a very uniform distribution of the acid in the meat can be achieved, avoiding the presence of pink "hot" spots caused by local overacidification and uncured spots caused by underacidification. An even pH throughout the meat is obtained. In other words, a rate of release which is degradative of the meat mass is prevented, in the present invention, by two mechanisms; one being the use of a water soluble coating, the other being the fine particle size, non-agglomerated state of the acidulant.

The present invention can be practiced with other meat products than winter sausage, for instance, fermented sausage commonly known as "summer sausage". Other types of fermented sausages with which the present invention is useful include pepperoni, Lebanon bologna, pork roll and cervelats (farmer, holsteiner, and thuringer). Other emulsion-types of sausages with which the present invention is useful include frankfurters and bologna, and "dry sausages", such as salami. Other meat products such as chopped meatloaf and potted comminuted meats can be acidulated in accordance with the present invention.

The present invention will be better understood by reference to the following example, which is illustrative but not limiting.

EXAMPLE 1

In this example, citric acid was coated with malto-dextrin (Maltrin M-100) from a malto-dextrin-containing solution having a solids content of about 40%. The coating was carried out in a Glatt spray agglomerator, Model "GPCG 500". This unit had a capacity of 500 kilos. Processing data was as follows: (See Table 3)

TABLE 3

| Amount of acid | 1,050 lbs. |
|---|---|
| Acid particle size | 3% max. on U.S. 30 |
|  | 5% max. thru U.S. 100 |
| Amount of coating | 450 lbs. |
| Amount of water in coating solution | 675 lbs. |
| Temperature of aqueous solution | 100-120° F. |
| Pump flow rate for solution | 120-150 lbs/hour |
| Drying air | 175-178° F. |
| Outlet air | 140-155° F. |
| Process time | 8 hours |

At the end of eight hours, the acid to coating ratio of the product was about 70:30. The coating was continuous. The product had a particle size not substantially greater than that of the original acid, with no ascertainable agglomeration. On addition to meat, during emulsification, a uniform lowering of pH is obtained. With a preserving and/or texturizing amount of acid, no overacidified "hot" spots or underacidified spots exist.

In the process for coating the acid, the flow rate of the starch coating and drying air temperature were important. For instance, at too high a drying air temperature it was possible for the starch solution to solidify without coating. Also important was atomization of the starch solution. The nozzle used is one known as a binary nozzle, having a port size of 1.2-2.5 mm. The liquid solution is passed through a central orifice surrounded by an annular air orifice. The nozzle head itself is provided with a circular array or plurality of these dual orifices, and the velocity of the multiple air streams is controllable. A conventional atomization pressure was used sufficient to obtain a fine mist spray which coats each particle. To be avoided is the presence of larger droplets, which could cause agglomeration.

Other applications other than the acidulation of meat exist for the products of the present invention. One example would be dry mixes such as powdered soup mixes, where protection of a highly water soluble core particle is desired, the coating also being water soluble. Other examples are certain pharmaceuticals and tea bags. In such example, the protective coating may be simply to prevent agglomeration of the core particle prior to use (highly soluble acid particles, for instance, are subject to agglomeration) or the protective coating may serve the function of delaying release.

One application with which the present application has been successfully practiced is applying a water soluble coating to yeast. Yeast itself is highly water soluble. Specifically, yeast has been coated with a whey protein concentrate marketed by Stauffer Chemical, under the trademark Enrpro 50. This product is a soluble, bland, protein food ingredient sold as a gelling agent or whipping agent. When dissolved in water at 30% concentration, the solution exhibits low viscosity and is very pumpable. Yeast was coated with this protein at a level of about 50% yeast and 50% protein. The product had a particle size distribution as follows:

| ON |  |
|---|---|
| 16 | 0.3% |
| 20 | 6.6% |

-continued

| ON |  |
|---|---|
| 40 | 88.1% |
| 60 | 5 |
| pan | 0 |

Processing temperature (drying air) in the Glatt agglomerator was 120°-130° F.

A similar protein that may be employed is ForeTein 35, a whey or whey protein concentrate marketed by Foremost Foods Company.

Also, yeast has been coated successfully with a starch hydrolysate marketed by National Starch under the trademark N-Lok. This starch, marketed primarily for the encapsulation of oils, fats and other water insoluble substances, was sprayed onto the yeast particles, in a fluidized bed, from a solution having a 30% solids concentration. At a coating level of 30% coating and 70% yeast, the following particle size distribution was obtained:

| ON |  |
|---|---|
| 20 | 86.6% |
| 40 | 13 |
| 60 | 4 |
| pan | 0 |

A principal acid for dispersion in meat is lactic acid, which adds a desirable flavor. However, since lactic acid is a liquid, it must first be plated onto a carrier. A suitable carrier is calcium lactate. Lactic acid plated onto such carrier in the amount of 60% acid and 40% carrier was successfully coated with Maltrin M-100 to give a particle distribution as follows:

| ON |  |
|---|---|
| 10 | .04 |
| 20 | 31.14 |
| 40 | 62.33 |
| 60 | 5.99 |
| 80 | .01 |
| pan | .49 |

What is claimed is:

1. A method for preparation of acidulated meat emulsions comprising the steps of
    (a) emulsifying a meat source;
    (b) mixing with said meat source during emulsification a preserving and/or texturizing amount of a particulate meat acidulant consisting essentially of a solid acid core particle having a continuous, substantially impervious coating thereon, said coating being a water soluble, film-forming, edible, bland, starch hydrolysate or protein, said starch hydrolysate or protein having a water solubility sufficient to produce a pumpable solution at about 20-40% solids concentration, based on solution weight;
    said acidulant being substantially non-agglomerated and having a particle size not substantially in excess of about 20 mesh, U.S. Standard Sieve;
    the ratio of said solid acid core particle to said coating being in the range of about 90-50:10-50;
    said coating being spray applied to said solid acid core particle in a fluid bed spray applicator.

2. The method of claim 1 wherein said meat emulsion is winter sausage cured without heating.

3. The method of claim 1 wherein said solid acid core particle is selected from the group consisting of citric acid, tartaric acid, fumaric acid, ascorbic acid, malic acid, iso-ascorbic acid, adipic acid, lactic acid on a solid carrier, glucono delta lactone, and compatible mixtures thereof, the particle size of the particulate acidulant being not substantially in excess of about 30 mesh, U.S. Standard Sieve.

4. The method of claim 3 wherein said starch hydrolysate is malto-dextrin, the ratio of solid acid core particle to starch hydrolysate coating being in the range of about 80–70:20–30.

5. The method of claim 3 wherein said coating is a starch hydrolysate applied from a clear solution, said starch hydrolysate having a water solubility sufficient to produce a pumpable solution at about 30–40% solids concentration.

* * * * *